United States Patent
Ueda

(10) Patent No.: US 8,314,888 B2
(45) Date of Patent: Nov. 20, 2012

(54) IMAGE DISPLAY DEVICE, METHOD AND IMAGING APPARATUS WITH ADAPTIVE REPOSITION PICTURE-IN-PICTURE

(75) Inventor: Tooru Ueda, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 709 days.

(21) Appl. No.: 12/367,137

(22) Filed: Feb. 6, 2009

(65) Prior Publication Data

US 2009/0201424 A1  Aug. 13, 2009

(30) Foreign Application Priority Data

Feb. 7, 2008  (JP) ................. P2008-027553

(51) Int. Cl.
*H04N 5/45* (2006.01)
(52) U.S. Cl. ............... 348/565; 348/561
(58) Field of Classification Search .......... None
See application file for complete search history.

(56) References Cited

U.S. PATENT DOCUMENTS

2002/0075407 A1* 6/2002 Cohen-Solal ........... 348/565
2002/0140861 A1* 10/2002 Janevski et al. .......... 348/565
2002/0140862 A1* 10/2002 Dimitrova et al. ......... 348/565

FOREIGN PATENT DOCUMENTS

| JP | 5-252510 A | | 9/1993 |
|---|---|---|---|
| JP | 05-252510 A | * | 9/1993 |
| JP | 2005-286590 A | | 10/2005 |
| JP | 2009-94879 A | | 4/2009 |

* cited by examiner

*Primary Examiner* — Jefferey Harold
*Assistant Examiner* — Sam Huang
(74) *Attorney, Agent, or Firm* — Birch, Stewart, Kolasch & Birch, LLP

(57) ABSTRACT

An image display device for displaying a main image and an auxiliary image that is combined with the main image in an auxiliary-image composite region of the main image, includes: a moving object detecting unit that detects a moving object which relatively moves in the main image; and a composite region determining unit that predicts a moving-object moving region, into which the moving object will move in the main image, based on a moving direction of the detected moving object, and determines the auxiliary-image composite region based on information relating to the moving-object moving region.

4 Claims, 19 Drawing Sheets

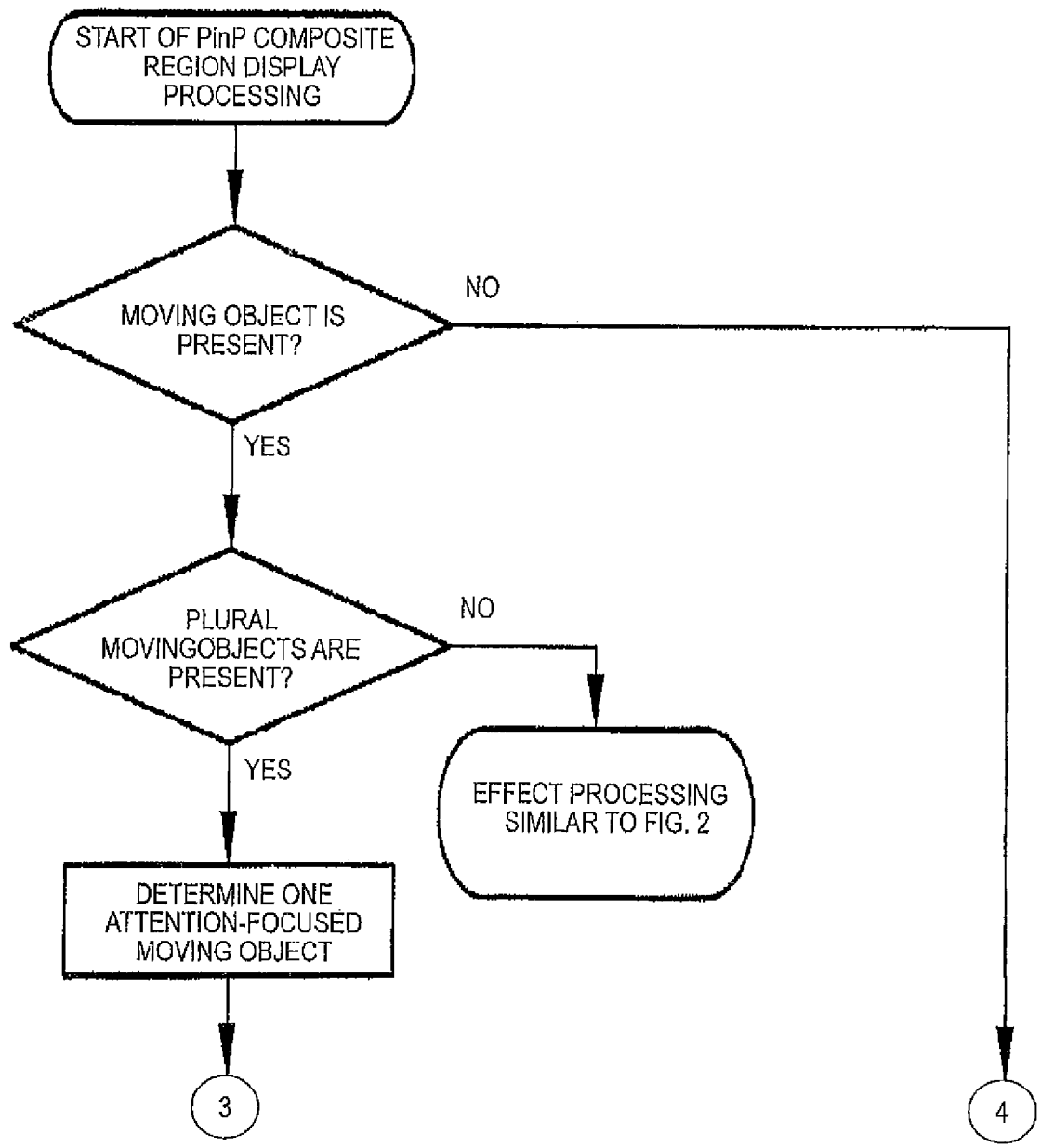

IMAGE DISPLAY DEVICE, METHOD AND IMAGING APPARATUS WITH ADAPTIVE REPOSITION PICTURE-IN-PICTURE

CROSS-REFERENCE TO RELATED APPLICATIONS

This application is based on and claims priority under 35 USC 119 from Japanese Patent Application No. 2008-027553 filed Feb. 7, 2008; the entire of which are incorporated herein by reference.

BACKGROUND

1. Technical Field

The present invention relates to an image display device, an image display method, and an imaging apparatus in which an image is combined and displayed in a portion of an image being captured.

2. Related Art

At present, a so-called Picture-in-Picture (PinP) technique is known in which an image is combined and displayed in a portion of a main image being captured. As techniques of displaying an image using the PinP, the following documents, for example, are known.

In patent document 1 (JP-A-5-252510), the size of a PinP composite region is changed with respect to the movement of a received image which is transmitted from a communication partner, or the turning on and off of combining processing is automatically controlled.

In patent document 2 (JP-A-2005-286590), a screen display region corresponding to the priority of one of a content, a scene, and a subject to which a user pays particular attention is stored, and the received content is displayed in the screen display region according to the set display priority.

FIG. 20 shows a state in which a moving picture is being displayed by using the PinP. However, when a moving object M, which is a subject of image capture, is displayed in a main image A, and a combined auxiliary image P is displayed in the PinP, there have been cases where the moving object M moves with the lapse of time and is overlapped with the position where the auxiliary image P is being combined, in which case the moving object M, i.e., the subject of image capture, is unable to be displayed properly, making it difficult for the user to view the moving object M.

The invention has been devised in view of the above-described circumstances, and its object is to provide an image display device, an image display method, and an imaging apparatus in which, at the time of combining by the PinP a predetermined image in an image including a moving subject during the capturing of a moving picture, a PinP composite region can be set in a visibly appropriate position,

SUMMARY

The above object of the invention is accomplished by the following configurations.

(1) According to an aspect of the invention, an image display device for displaying a main image and an auxiliary image that is combined with the main image in an auxiliary-image composite region of the main image, includes: a moving object detecting unit that detects a moving object which relatively moves in the main image; and a composite region determining unit that predicts a moving-object moving region, into which the moving object will move in the main image, based on a moving direction of the detected moving object, and determines the auxiliary-image composite region based on information relating to the moving-object moving region.

(2) According to the image display device of (1), the composite region determining unit may, when a position of the auxiliary image being combined with the main image is set in the moving-object moving region, change the position of the auxiliary image to be set in one of regions excluding the moving-object moving region in the main image.

(3) According to the image display device of (1) or (2), the composite region determining unit may determine the moving direction of the moving object based on a moving vector of the moving object.

(4) According to the image display device of any one of (1) to (3), the composite region determining unit, when the moving object detecting unit detects a plurality of moving objects in the main image, may predict the moving-object moving region for each of the detected moving objects based on a moving direction of each of the detected moving objects.

(5) According to the image display device of (4), among the plurality of moving object members, a moving object which reaches the auxiliary-image composite region fastest may be set as an attention-focused moving object. And the composite region determining unit may determine the auxiliary-image composite region to a region other than the moving-object moving region into which the attention-focused moving object will move.

(6) According to the image display device of (5), the composite region determining unit may judges as to whether or not the auxiliary-image composite region determined based on the moving-object moving region of the attention-focused moving object overlaps with the moving-object moving region into which another one of the plurality of moving objects will move. And the composite region determining unit, when it overlaps, may determine the auxiliary-image composite region to a region from which the moving-object moving region into which said another one will move is excluded.

(7) According to the image display device of (5), the composite region determining unit may judge as to whether or not the auxiliary-image composite region determined based on the moving-object moving region of the attention-focused moving object overlaps with the moving-object moving region into which another one of the plurality of moving objects will move. And the composite region determining unit, when it overlaps, may compute a time until said another one reach the auxiliary-image composite region, and set, when said time is greater than or equal to a fixed time, the auxiliary-image composite region in a region which overlaps with the moving-object moving region of the attention-focused moving object.

(8) According to the image display device of any one of (1) to (7), the composite region determining unit, when a moving speed of the moving object is greater than a preset value, may keep the auxiliary-image composite region.

(9) According to another aspect of the invention, an image display method for displaying a main image and an auxiliary image that is combined with the main image in an auxiliary-image composite region of the main image, includes: detecting a moving object which relatively moves in the main image; predicting a moving-object moving region, into which the moving object will move in the main image, based on a moving direction of the detected moving object; and determining the auxiliary-image composite region based on information relating to the moving-object moving region.

(10) According to the image display method of (9), determining the auxiliary-image may include changing when a position of the auxiliary image being combined with the main image is set in the moving-object moving region, the position of the auxiliary image to be set in one of regions excluding the moving-object moving region in the main image.

(11) According to the image display method of (9) or (10), determining the auxiliary-image composite region may include determining the moving direction of the moving object based on a moving vector of the moving object.

(12) According to the image display method of any one of (9) to (11), predicting the moving-object moving region may include, when detects a plurality of moving objects in the main image, predicting the moving-object moving region for each of the detected moving objects based on a moving direction of each of the detected moving objects.

(13) According to the image display method of (12), among the plurality of moving object members, a moving object which reaches the auxiliary-image composite region fastest may be set as an attention-focused moving object. And determining the auxiliary-image composite region may include determining the auxiliary-image composite region to a region other than the moving-object moving region into which the attention-focused moving object will move.

(14) According to the image display method of (13), determining the auxiliary-image composite region may include judging as to whether or not the auxiliary-image composite region determined based on the moving-object moving region of the attention-focused moving object overlaps with the moving-object moving region into which another one of the plurality of moving objects will move. And determining the auxiliary-image composite region may further include, determining, when it overlaps, the auxiliary-image composite region to a region which exclude the moving-object moving region into which said another one will move.

(15) According to the image display method of (14), determining the auxiliary-image composite region may include judging as to whether or not the auxiliary-image composite region determined based on the moving-object moving region of the attention-focused moving object overlaps with the moving-object moving region into which another one of the plurality of moving objects will move. And determining the auxiliary-image composite region may include computing, when it overlaps, a time until said another one reaches the auxiliary-image composite region. And determining the auxiliary-image composite region may include setting, when said time is greater than or equal to a fixed time, the auxiliary-image composite region in a region which overlaps with the moving-object moving region of the attention-focused moving object.

(16) According to the image display method of any one of (9) to (15), determining the auxiliary-image composite region may include, when a moving speed of the moving object is greater than a preset value, keeping the auxiliary-image composite region.

(17) According to another aspect of the invention, an image display apparatus for displaying a main image and an auxiliary image that is combined with the main image in an auxiliary-image composite region of the main image, includes: an imaging unit that images at least one of the main image and the auxiliary image; a moving object detecting unit that detects a moving object which relatively moves in the main image; and a composite region determining unit that predicts a moving-object moving region, into which the moving object will move in the main image, based on a moving direction of the detected moving object, and determines the auxiliary-image composite region based on information relating to the moving-object moving region.

Here, the moving object indicates an object which relatively moves in the main image, and is not limited to a subject which is moving. For example, the moving object includes a stationary subject whose position is displayed as moving with respect to the main image when an imaging apparatus is moved at a speed during the capturing of a picture.

In the invention, a moving object which relatively moves in the main image is detected, and a moving-object moving region where the moving object is predicted to move is determined in the main image on the basis of the moving direction of that moving object. At this time, since the moving-object moving region is a region where the moving object is sooner or later displayed with the lapse of time, an auxiliary image is combined in a region other than the moving-object moving region on the basis of information relating to the moving-object moving region, thereby making it possible to avoid the combined auxiliary image and the moving object being displayed in an overlapping manner. By so doing, it is possible to automatically combine an auxiliary image with the main image at an appropriate position where it does not overlap with the moving object in the main image. Hence, since the user is able to browse the main image and the auxiliary image comfortably, and it is unnecessary for the user to effect processing such as manually setting the region for combining an auxiliary image by himself or herself, the usability is excellent.

According to the invention, it is possible to provide an image display device, an image display method, and an imaging apparatus in which, at the time of combining by the PinP a predetermined image in an image including a moving subject, a PinP composite region can be set in a visibly appropriate position.

DETAILED DESCRIPTION

Hereafter, a detailed description will be given of the embodiments of the invention with reference to the accompanying drawings.

Figure 1:
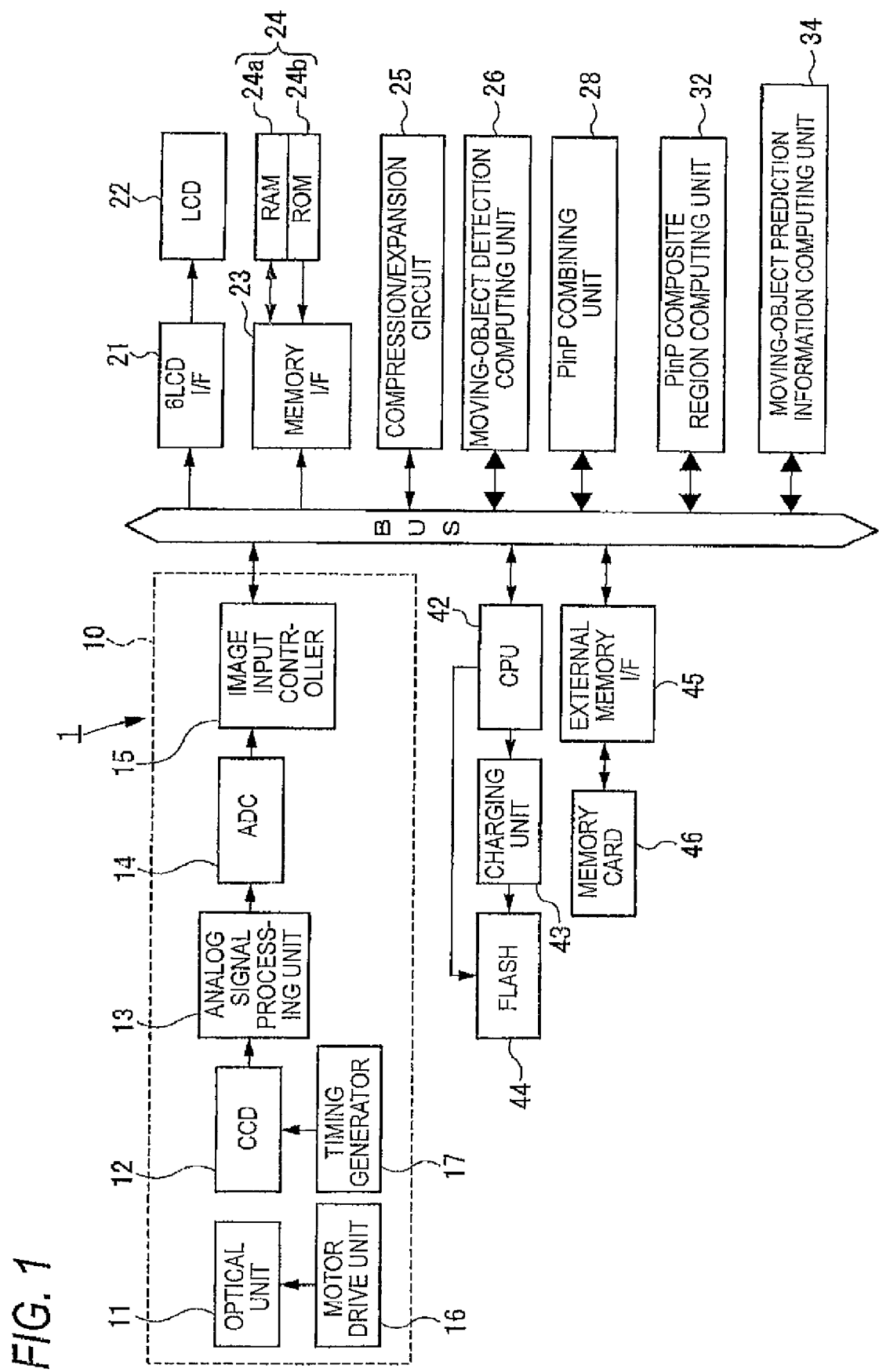
FIG. 1 is a schematic diagram illustrating an example of an image display device and an imaging apparatus in accordance with the invention.

FIG. 1 is a schematic diagram illustrating an example of an image display device and an imaging apparatus in accordance with the invention. In the following embodiments, a description will be given of the configuration of a digital camera by way of example, but the image display device and the imaging apparatus are not particularly limited thereto.

A digital camera 1 has an imaging unit 10 for capturing an image of a subject. The imaging unit 10 has an optical unit 11 including a lens and the like; a solid-state imaging device (COD) 12; an analog signal processing unit 13 to which image data of an analog signal generated by the solid state imaging device 12 is inputted; an A/D conversion unit 14 for converting the analog signal subjected to signal processing into a digital signal; an image input controller 15 for generating digital image data on the basis of the input signal from the A/D conversion unit 14; a motor drive unit 16 for driving the optical unit 11; and a timing generator 17 for generating and outputting a drive signal for the solid-state imaging device 12 during driving.

In addition, the digital camera 1 has a central processing unit (CPU) 42, an electronic flash 44, and a charging unit 43 for the electronic flash 44. The imaging unit 10 and the CPU 42 are connected to each other via a bus.

A display unit (6LCD) interface 21, a memory interface 23, and a compression/expansion circuit 25 are connected to the CPU 42 via a bus. A liquid crystal display (LCD) 22 which functions as a display unit for displaying a captured image is connected to the display unit (6LCD) interface 21. In addition, a memory 24 including a random access memory (RAM) 24a and a read only memory (ROM) 24b is connected to the memory interface 23.

During the capturing of a moving picture, the digital camera 1 in accordance with the embodiments is capable of allowing an image being captured to be combined with another image smaller than that image and of displaying them on the LCD 22. Here, in the invention, the image being captured during the capturing of a moving picture will be referred to as a main image, and the other image which is combined with the main image will be referred to as an auxiliary image. The auxiliary image includes, for instance, an image which is displayed by Picture in Picture, and may be not only an image but character information, an animation, a pattern, and a symbol.

The digital camera 1 has a moving-object detection computing unit 26 for detecting a moving object (e.g., a walking person) which relatively moves in the area of the main image. The moving-object detection computing unit 26 detects the moving object from differential data of the main image for each predetermined interval during the capturing of a moving picture. As the differential data, it is possible to use coordinate information in the main image, and the position of a moving object in the main image can be expressed by this coordinate information. It should be noted that, as a technique of moving-object detection, it is possible to use a known one.

In addition, the digital camera 1 has a moving-object prediction information computing unit 34 which is capable of computing the moving direction and the moving speed of the moving object by computing a moving vector of the moving object on the basis of the differential data detected by the moving-object detection computing unit 26.

Further, the digital camera 1 has a PinP composite region computing unit 32 for determining an auxiliary-image composite region (also referred to as the PinP composite region in the embodiments described below) for combining an auxiliary image (also referred to as the PinP in the embodiments described below) with the main image on the basis of the moving direction and the moving speed of the moving object determined by the moving-object prediction information computing unit 34, as well as a PinP combining unit 28 for combining an auxiliary image in the PinP composite region determined by the PinP composite region computing unit 32. A description will be given later of the procedure for determining the region for combining the auxiliary image with the main image.

Figure 2:
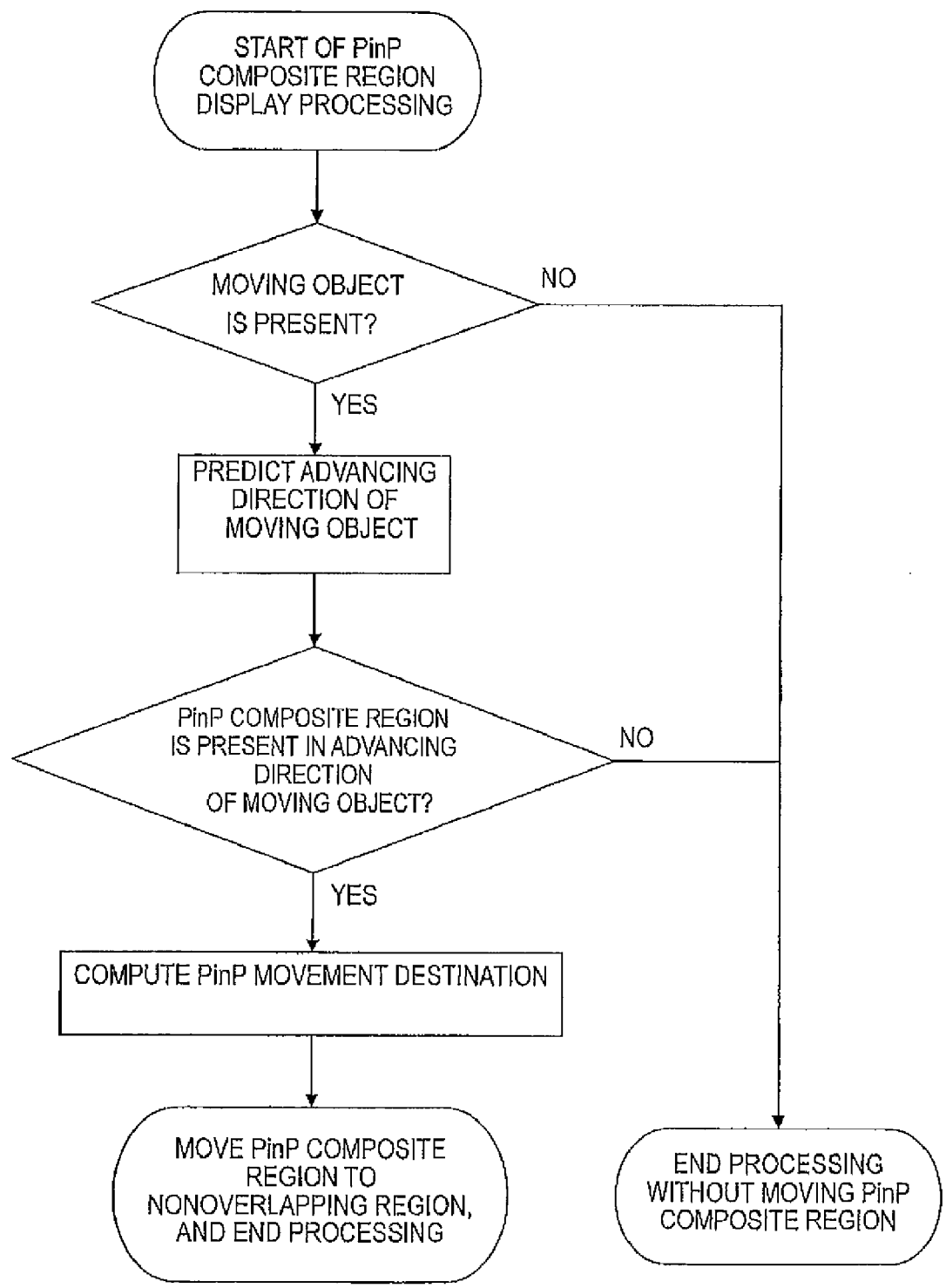
FIG. 2 is a flowchart illustrating the procedure of a first embodiment.
Figure 3:
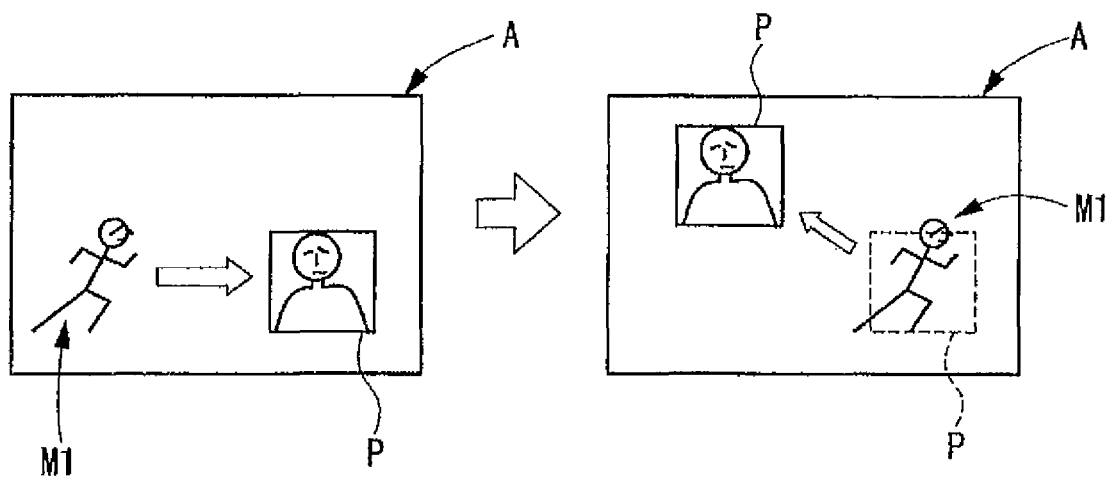
FIG. 3 is a diagram explaining the states of a main image and an auxiliary image shown in the procedure of FIG. 2.
Figure 4A:
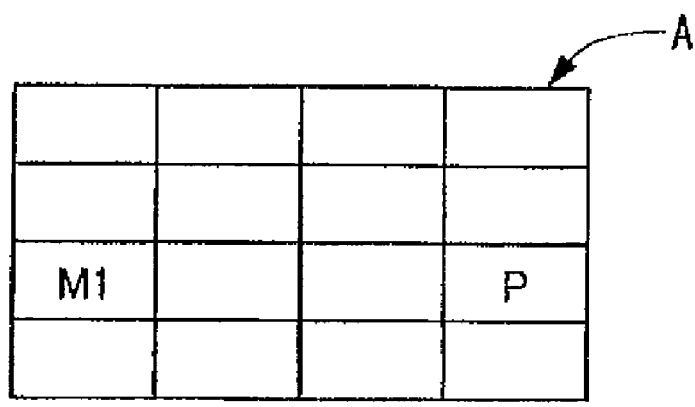
FIGS. 4A to 4C are diagrams illustrating the procedure for determining a region for combining the auxiliary image with the main image in the first embodiment.
Figure 4B:
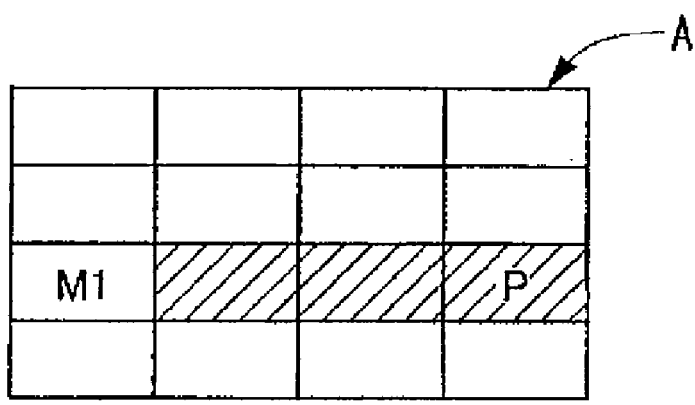
Figure 4C:
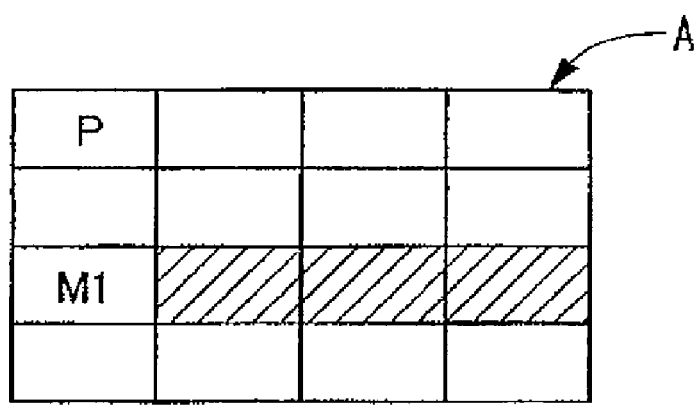

A description will be given of a first embodiment in accordance with the invention with reference to FIGS. 2 to 4C FIG. 2 is a flowchart illustrating the procedure of this embodiment. FIG. 3 is a diagram explaining the states of a main image and an auxiliary image shown in the procedure of FIG. 2. FIGS. 4A to 4C are diagrams illustrating the procedure for determining a region for combining the auxiliary image with the main image in this embodiment.

As shown in FIG. 2, first, when the capturing of a moving picture is started, and processing for combining an auxiliary image with a main image is set, a determination is made by the moving-object detection computing unit 26 as to whether or not a moving object is present in the main image. Here, the moving object indicates an object which relatively moves in the main image, and is not limited to a subject which is moving. For example, the moving object includes a stationary subject which is displayed as moving in the main image when the digital camera 1 is moved at a predetermined speed during the capturing of a picture.

When the moving object has been detected, the processing proceeds to a step of predicting the advancing direction of the moving object. When the moving object has not been detected, the processing ends without moving the auxiliary-image composite region for displaying an auxiliary image combined with the main image.

FIG. 4A shows in which regions of the main image divided into a plurality of regions a moving object M1 and an auxiliary-image composite region P for displaying an auxiliary image are present. The number and sizes of the plurality of regions obtained by dividing the main image are not particularly limited, and can be set appropriately in correspondence with the sizes and the like of the subject to be imaged and the auxiliary image to be combined.

The advancing direction of the moving object is determined by the moving-object prediction information computing unit 34 on the basis of, for instance, the moving vector of the moving object. The moving direction of the moving object can be determined as the direction in which the moving object has moved in a predetermined time period is computed on the basis of the differential data of the moving object between frames.

As shown in FIG. 4B, a region where the moving object in the main image moves is specified with the lapse of time in accordance with the determined advancing direction of the moving object. In FIG. 4B, the region indicated by the tone shows the region where the moving object moves. This region where the moving object will move is hereafter referred to as the moving-object moving region.

After the prediction of the advancing direction of the moving object, a determination is made as to whether or not a region where an auxiliary image is combined is overlappingly present in the advancing direction of the moving object. Specifically, if the auxiliary-image composite region P is present in the moving-object moving region, as shown in FIG. 4B, a determination is made that a region where an auxiliary image is combined is overlappingly present in the advancing direction of the moving object. If the auxiliary-image composite region P is not present in the moving-object moving region, the processing ends without moving the auxiliary-image composite region P. In a case where an auxiliary image has not yet been combined with a main image A, a determination is made as to whether or not the auxiliary-image composite region set by default in the above-described procedure overlaps with the moving-object moving region. If it does not overlap, the auxiliary image can be combined with that region and can be displayed on the LCD 22.

It a region where an auxiliary image is combined is overlappingly present in the advancing direction of the moving object, a region other than the moving-object moving region in the main image A is designated by arithmetic operation, as shown in FIG. 4C, and the auxiliary-image composite region P is moved to the predetermined region to effect combining and display processing. By so doing, it is possible to avoid the display of the moving object M1 overlapping with the auxiliary-image composite region P in the main image A.

The moving object Ml which relatively moves in the main image A is detected, and the moving-object moving region where the moving object M1 will move is determined in the main image A on the basis of the moving direction of that moving object M1. At this time, an auxiliary image is combined in a region other than the moving-object moving region on the basis of information on the moving-object moving region, i.e., the region where the moving object is displayed, thereby making it possible to avoid the combined auxiliary image and the moving object being displayed in an overlapping manner. By so doing, it is possible to automatically combing an auxiliary image at an appropriate position where it does not overlap with the moving object M1 in the main image A. Hence, since the user is able to browse the main image A and the auxiliary image comfortably, and it is unnecessary for the user to effect processing such as manually setting the region for combining an auxiliary image by himself or herself, the usability is excellent.

Next, a description will be given of a second embodiment in accordance with the invention with reference to FIGS. 5 to 8C.

In the above-described first embodiment, a description has been given of the procedure for determining an auxiliary-image composite region in a case where there is only one moving object. In this embodiment, however, a description wilt be given of the procedure for determining an auxiliary-image composite region in a case where there is a plurality of moving objects.

Figure 5:
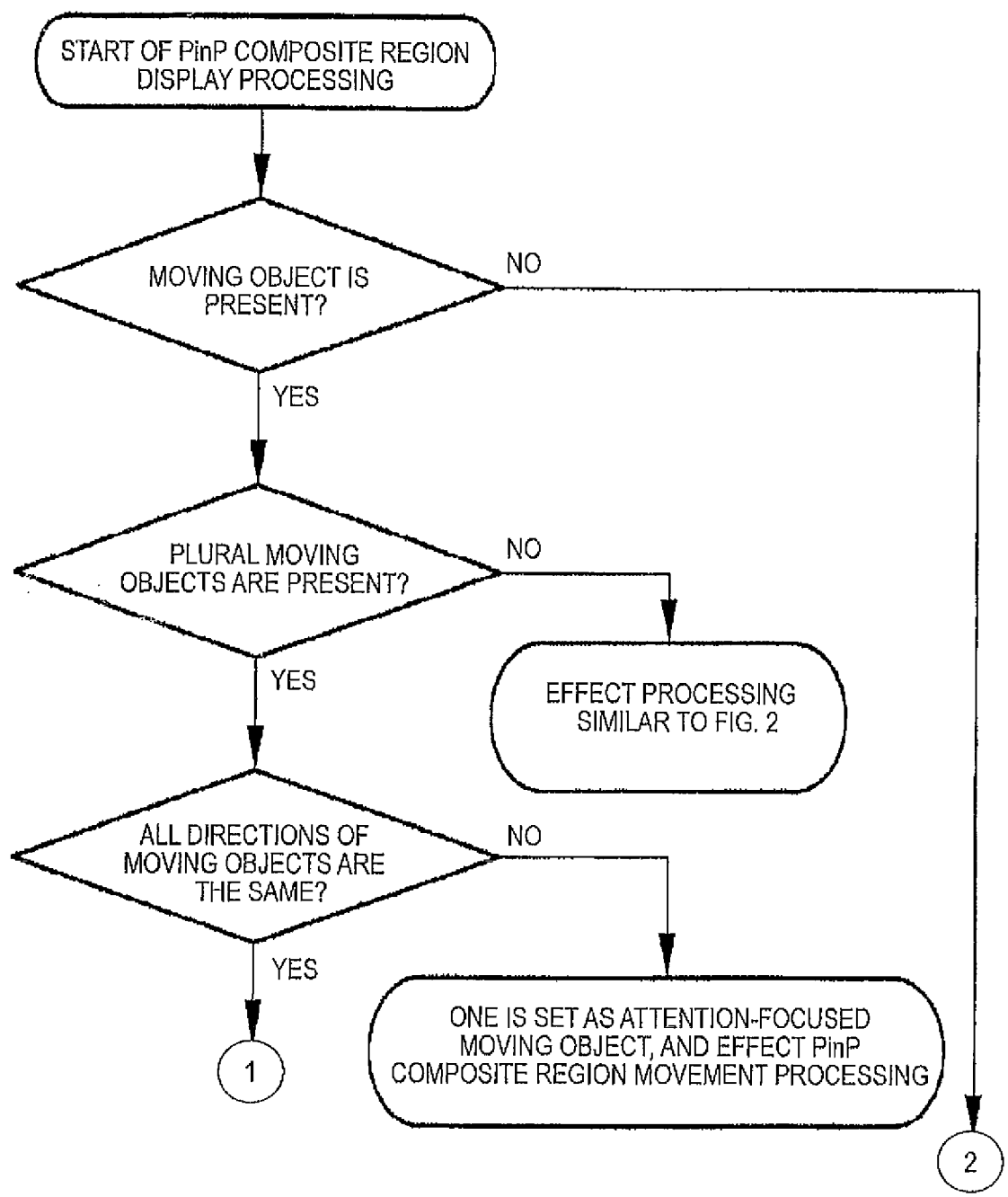
FIG. 5 is a flowchart illustrating the procedure of a second embodiment.
Figure 5:
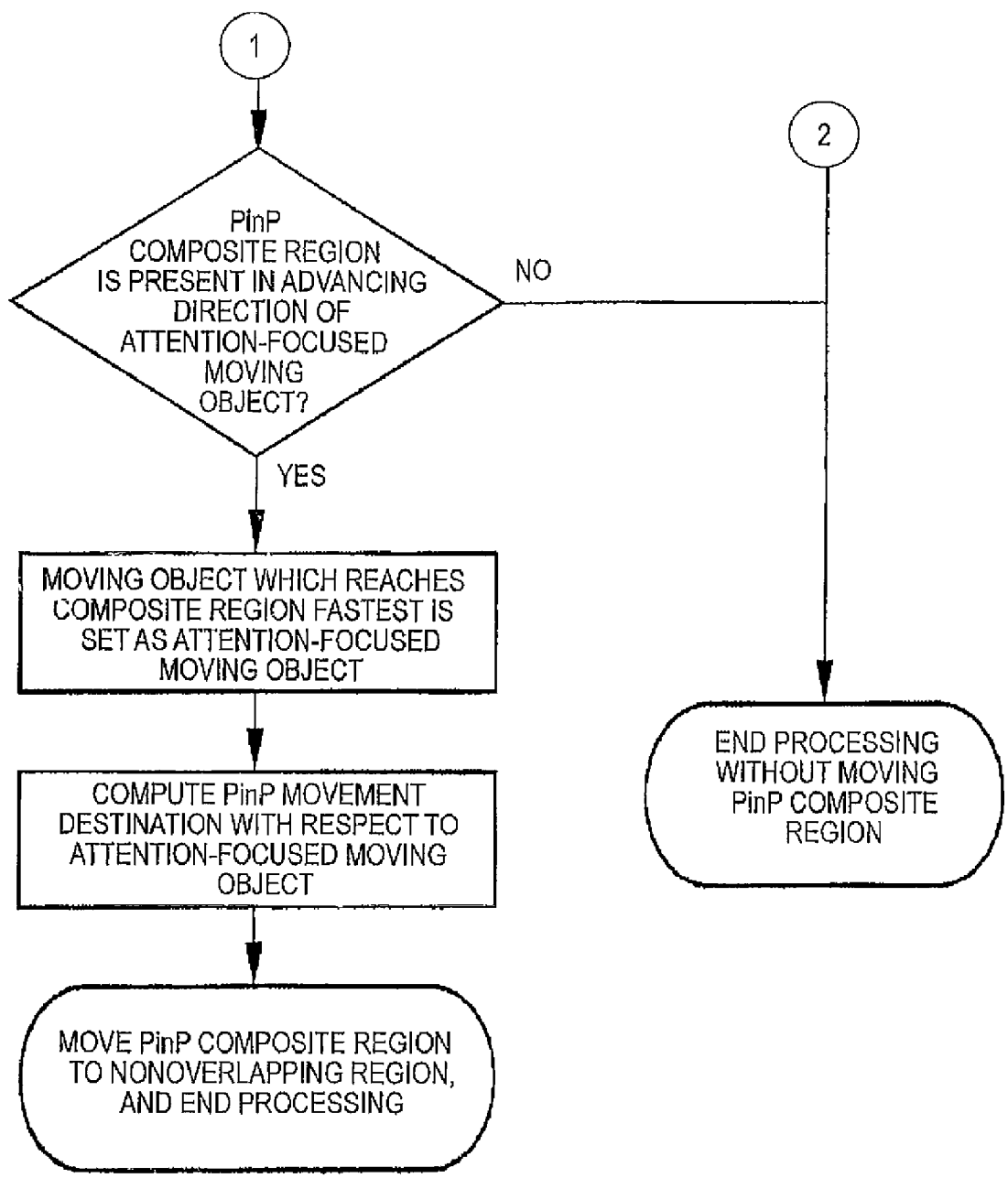
Figure 6:
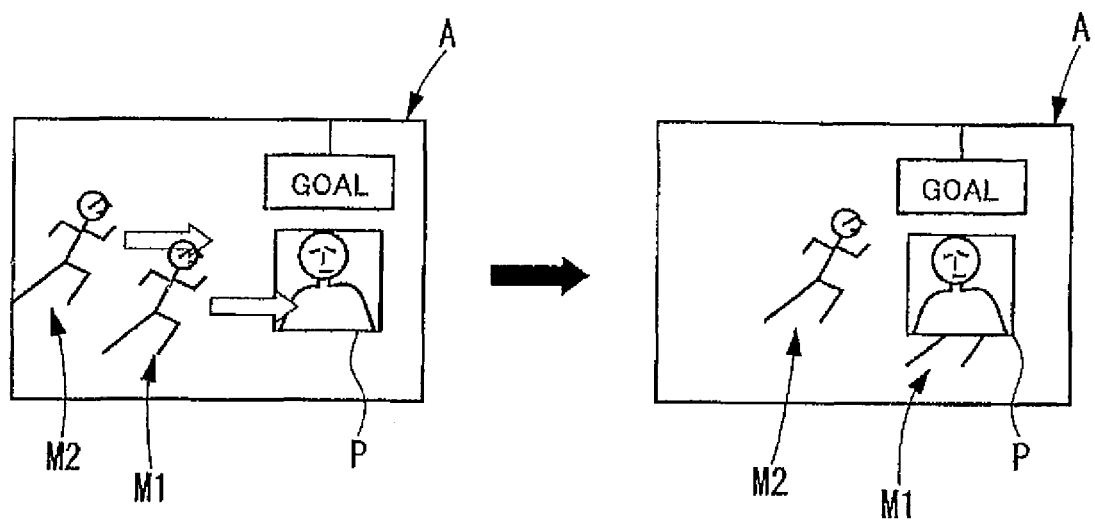
FIG. 6 is a diagram explaining the states of the main image and the auxiliary image in a case where the procedure of the second embodiment is not used.
Figure 7:
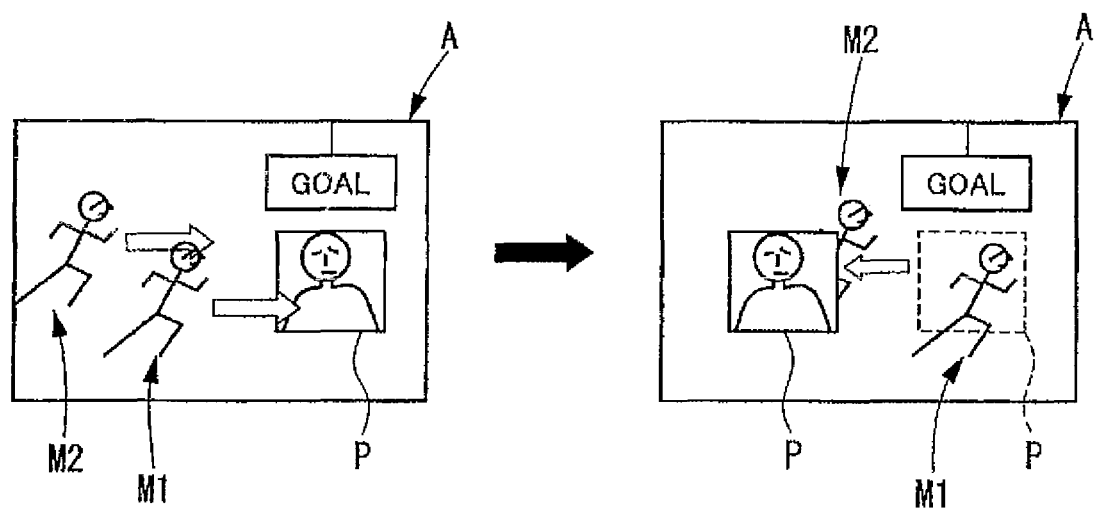
FIG. 7 is a diagram explaining the states of the main image and the auxiliary image shown in the procedure of FIG. 5.
Figure 8A:
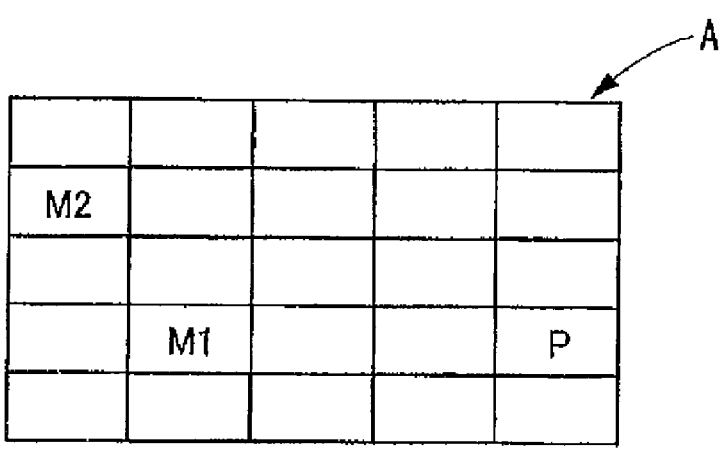
FIGS. 8A to 8C are diagrams illustrating the procedure for determining a region for combining the auxiliary image with the main image in second embodiment.
Figure 8B:
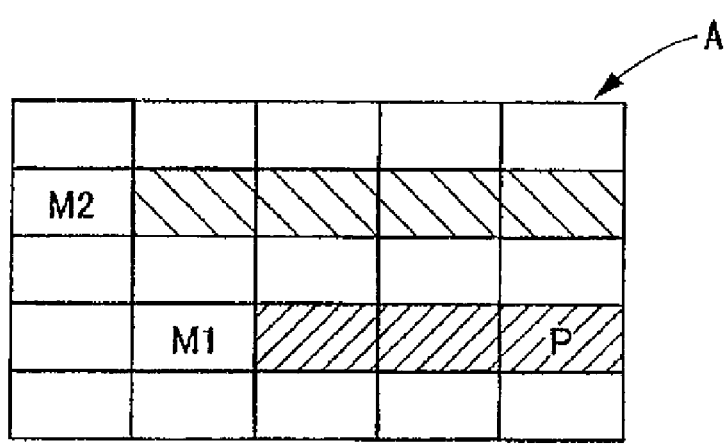
Figure 8C:
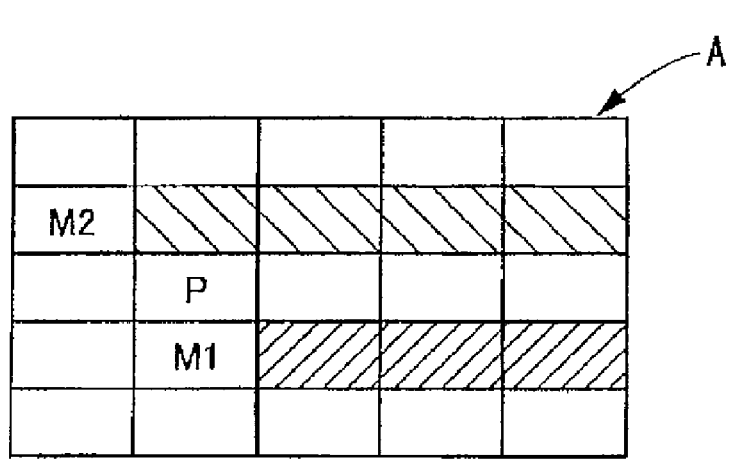

FIG. 5 is a flowchart illustrating the procedure of this embodiment. FIG. 6 is a diagram explaining the states of the main image and the auxiliary image in a case where the procedure of this embodiment is not used. FIG. 7 is a diagram explaining the states of the main image and the auxiliary image shown in the procedure of FIG. 5. FIGS. 8A to 8C are diagrams illustrating the procedure for determining a region for combining the auxiliary image in this embodiment.

As shown in FIG. 5, first, when the capturing of a moving picture is started, and processing for combining an auxiliary image with a main image is set, a determination is made by the moving-object detection computing unit 26 as to whether or not a moving object is present in the main image. If it is determined that there is a moving object, a determination is made as to whether or not there are a plurality of moving objects. If there is only one moving object, the auxiliary-image composite region can be determined by a processing procedure similar to that of the above-described embodiment shown in FIG. 2.

If it is detected that there is a plurality of moving objects, the processing proceeds to a step of predicting the advancing direction of each of the plurality of moving objects. It should be noted that FIGS. 6 and 7 show a case in which two moving objects M1 and M2 are being displayed in the main image A. FIG. 8A shows a state in which the moving objects M1 and M2 and the auxiliary-image composite region P are set in divided regions of the main image A.

In an ensuing step, the moving-object moving region is computed for each of the moving objects M1 and M2 (FIG. 8B), and a determination is made as to whether or not the advancing directions of the plurality of moving objects are all the same. Here, if the advancing directions of the plurality of moving objects M1 and M2 are not all the same, one of the plurality of moving objects M1 and M2 is set as an attention-focused moving object (the moving object M1 in this embodiment). Here, the method of setting an attention-focused moving object is not particularly restricted, and may be automatically set on the basis of the size, the moving speed, or the like.

If the advancing directions of the plurality of moving objects M1 and M2 are all the same, a moving object which will reach the auxiliary-image composite region P fastest among the plurality of moving objects M1 and M2 is set as the attention-focused moving object. Here, the time when the moving objects M1 and M2 reach the auxiliary-image composite region P can be computed on the basis of the above-described differential data. In FIG. 7, since, of the plurality of the moving objects M1 and M2, the moving object M1 reaches the present auxiliary-image composite region P faster than the moving object M2, the moving object M1 is set as the attention-focused moving object.

As shown in FIGS. 8B and 8C, in a case where the auxiliary-image composite region P is set in the moving-object moving region of the moving object M1 set as the attention-focused moving object, a region which does not overlap with the moving-object moving region of the moving object M1 and the moving-object moving region of the moving object M2 is computed by arithmetic operation to change the auxiliary-image composite region P.

Thus, in this embodiment, in a case where the plurality of moving objects M1 and M2 is present in the main image A, an attention-focused moving object is set from among the plurality of moving objects M1 and M2, and the auxiliary-image composite region P is determined with respect to that attention-focused moving object. Accordingly, even in the case where the plurality of moving objects M1 and M2 is present in the main image, each of the moving objects does not become difficult to view due to being overlapped with the auxiliary-image composite region P. For example, when a plurality of moving objects (e.g., running persons) move to a predetermined position (e.g., a goal), as shown in FIG. 6, if the auxiliary-image composite region P continues to be displayed at the predetermined position, the moving object M1 would overlap with the auxiliary-image composite region P. Accordingly, if the moving object M1 is set as the attention-focused moving object and the auxiliary-image composite region P is determined in the procedure of this embodiment, it is possible to avoid the moving object M1 and the auxiliary-image composite region P overlapping with each other.

Next, a description will be given of a third embodiment in accordance with the invention with reference to FIGS. 9 to 12C.

Figure 9:
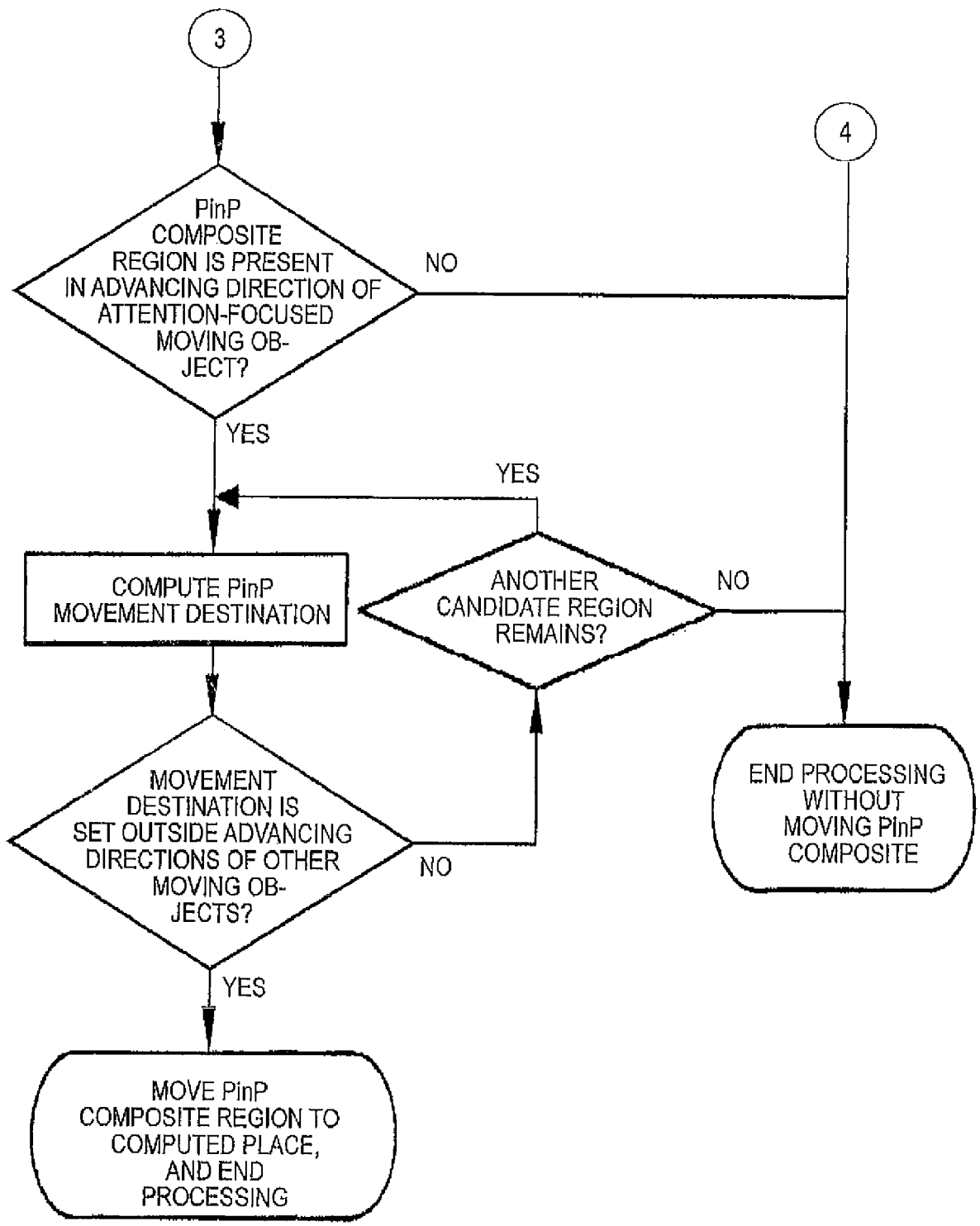
FIG. 9 is a flowchart illustrating the procedure of a third embodiment.
Figure 10:
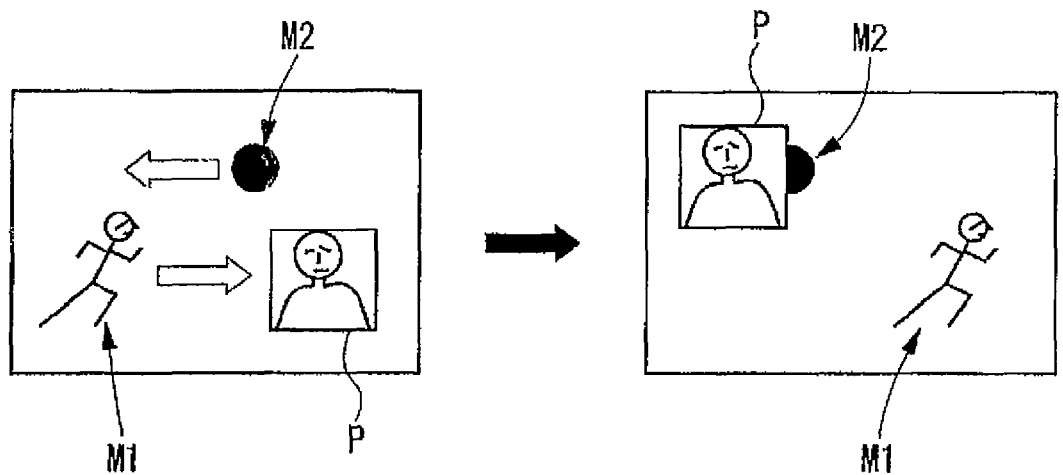
FIG. 10 is a diagram explaining the states of the main image and the auxiliary image in a case where the procedure of the third embodiment is not used.
Figure 11:
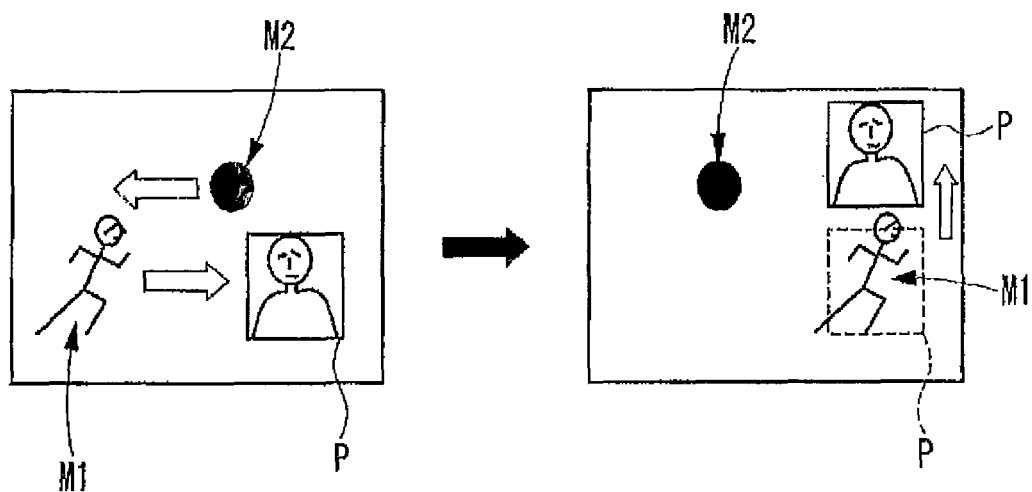
FIG. 11 is a diagram explaining the states of the main image and the auxiliary image in a case where the procedure shown in FIG. 9 is used.
Figure 12A:
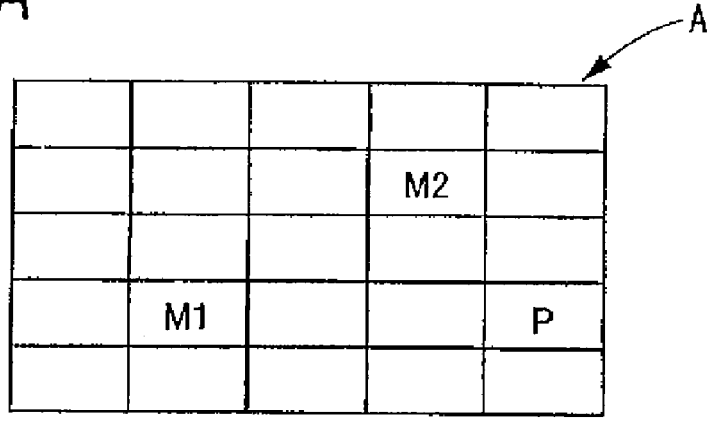
FIGS. 12A to 12C are diagrams illustrating the procedure for determining a region for combining the auxiliary image with the main image in the third embodiment
Figure 12B:
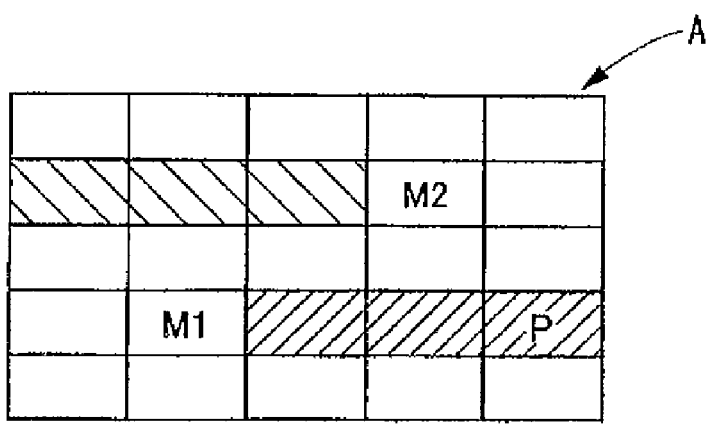
Figure 12C:
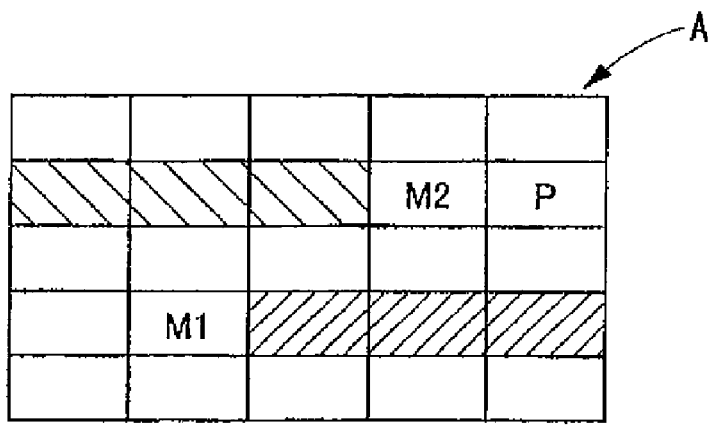

In the above-described second embodiment, a description has been given of the procedure for determining an auxiliary-image composite region in the case where the moving directions of a plurality of moving objects are the same. However, the auxiliary-image composite region can also be determined by the following procedure in a case where the moving directions of a plurality of moving objects are respectively different. FIG. 9 is a flowchart illustrating the procedure of this embodiment. FIG. 10 is a diagram explaining the states of the main image and the auxiliary image in a case where the procedure of this embodiment is not used. FIG. 11 is a diagram explaining the states of the main image and the auxiliary image in a case where the procedure shown in FIG. 9 is used. FIGS. 12A to 12C are diagrams illustrating the procedure for determining a region for combining the auxiliary image in this embodiment.

As shown in FIG. 9, first, when the capturing of a moving picture is started, and processing for combining an auxiliary image with a main image is set, a determination is made by the moving-object detection computing unit 26 as to whether or not a moving object is present in the main image. If it is determined that there is a moving object, a determination is made as to whether or not there are a plurality of moving objects. If there is only one moving object, the auxiliary-image composite region P can be determined by a processing procedure similar to that of the above-described embodiment shown in FIG. 2.

If it is detected that there are a plurality of moving objects, the processing proceeds to a step of predicting the advancing direction of each of the plurality of moving objects. It should be noted that FIGS. 10 and 11 show a case in which two moving objects M1 and M2 are being displayed in the main image A. As shown in FIGS. 10 and 11, in this embodiment, the plurality of moving objects M1 and M2 are moving in respectively different directions. In addition, FIG. 12A shows a state in which the moving objects M1 and M2 and the auxiliary-image composite region P are set in divided regions of the main image A.

In this embodiment, one of the plurality of moving objects M1 and M2 is set as an attention-focused moving object. Here, criteria for determining the attention-focused moving object is not particularly restricted, and the moving speed, the amount of movement, the size, and the like of each of the moving objects M1 and M2, for example, can be used as the criteria.

Next, a determination is made as to whether or not the auxiliary-image composite region P has been set outside the moving-object moving region of the moving object M1 set as the attention-focused moving object. If the auxiliary-image composite region P has been set outside the moving-object moving region of the moving object M1, the processing ends without changing the auxiliary-image composite region P.

Meanwhile, as shown in FIG. 12B, if the auxiliary-image composite region P has been set in the moving-object moving region of the moving object M1 set as the attention-focused moving object, a region other than the moving-object moving region of the moving object M1 in the main image A is subsequently computed by arithmetic operation. A determination is then made as to whether or not the auxiliary-image composite region P further overlaps with the moving-object moving region of the other moving object M2 in the region other than the moving-object moving region of the moving object M1. In this embodiment, a description is given of the case where the number of the moving objects is two; however, in a case where the number of the moving objects is three, a determination is made as to whether or not the region to which the auxiliary-image composite region P is moved overlaps with the moving-object moving regions of all the moving objects. Here, if the moved auxiliary-image composite region P overlaps with the moving-object moving regions of the moving objects, it is determined that the auxiliary-image composite region P cannot be changed, and the processing ends.

In a case where a region which does not overlap with the moving-object moving region of the other moving object M2 is present, as shown in FIG. 12C, the auxiliary-image composite region P is changed to that region, and the auxiliary image is combined and is displayed on the LCD 22.

According to this embodiment, in the case where the plurality of moving objects M1 and M2 are present in the main image A, and the moving objects M1 and M2 move in respectively different directions, as shown in FIG. 11, the attention-focused moving object M1 and the auxiliary image are not displayed in an overlapping manner, and when the auxiliary image is moved, it is possible to avoid the auxiliary image from being displayed overlapping with the other moving object M2.

Next, a description will be given of a fourth embodiment in accordance with the invention with reference to FIGS. 13 to 16C.

Figure 13:
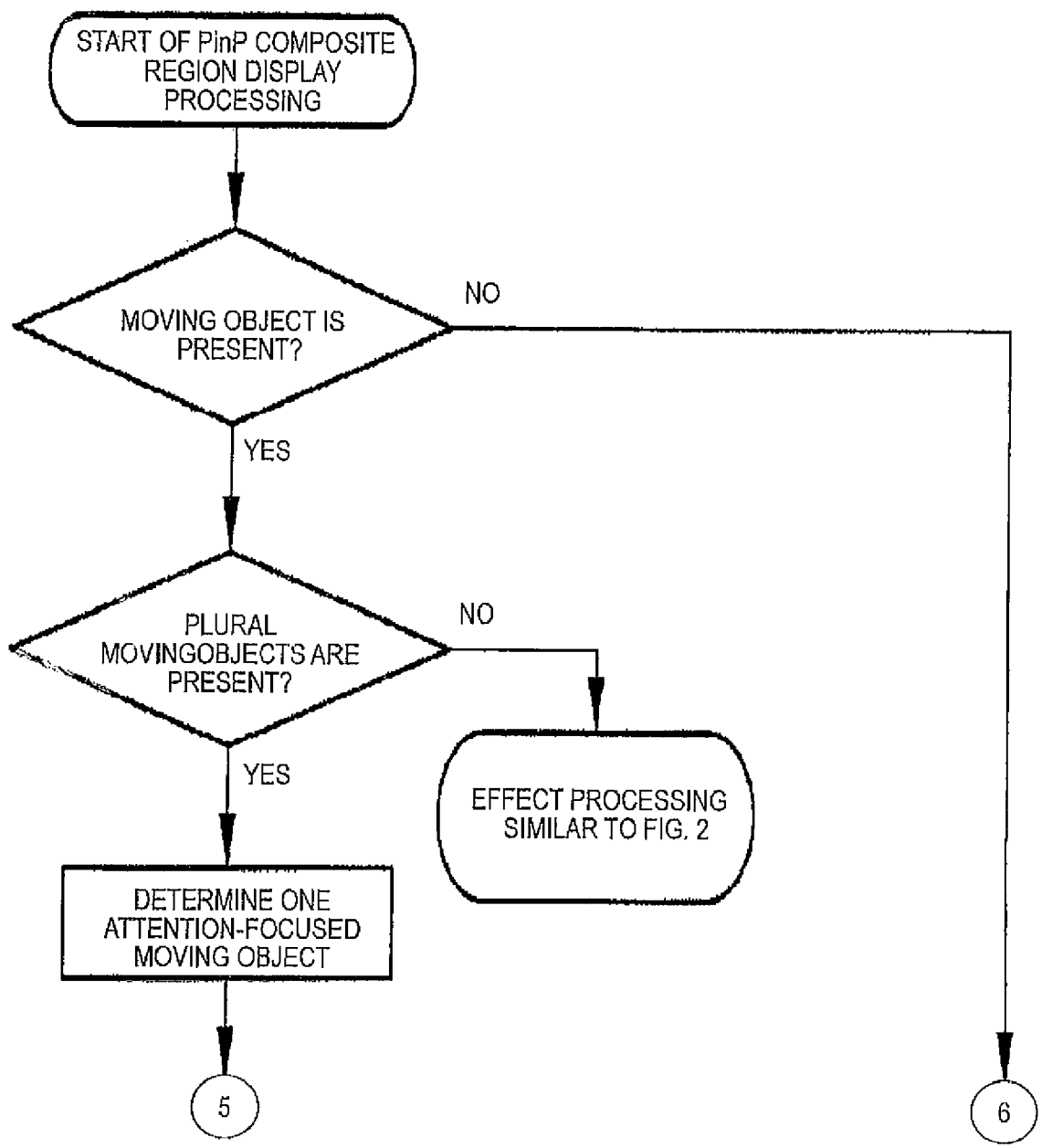
FIG. 13 is a flowchart illustrating the procedure of a fourth embodiment.
Figure 13:
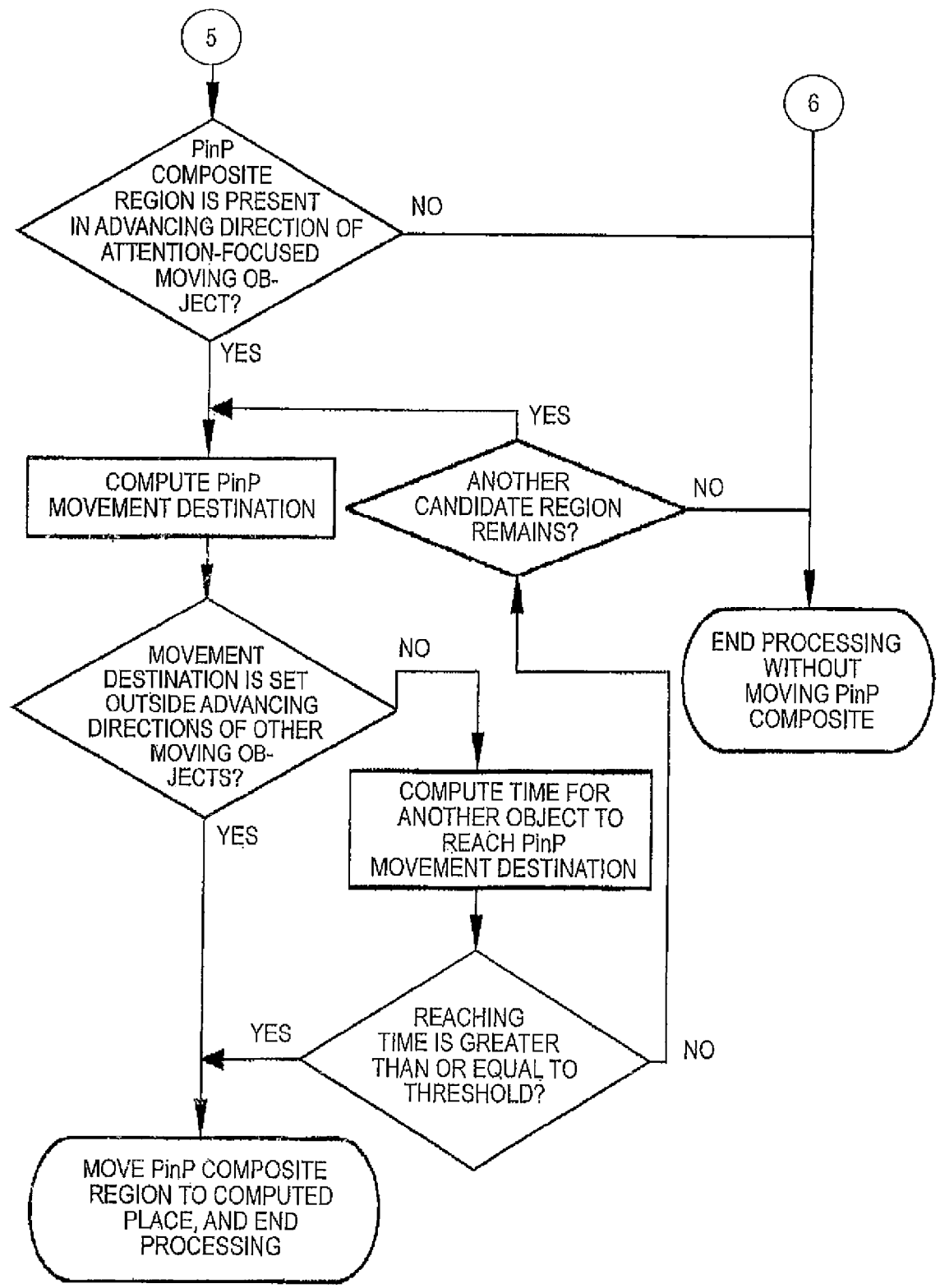
Figure 14:
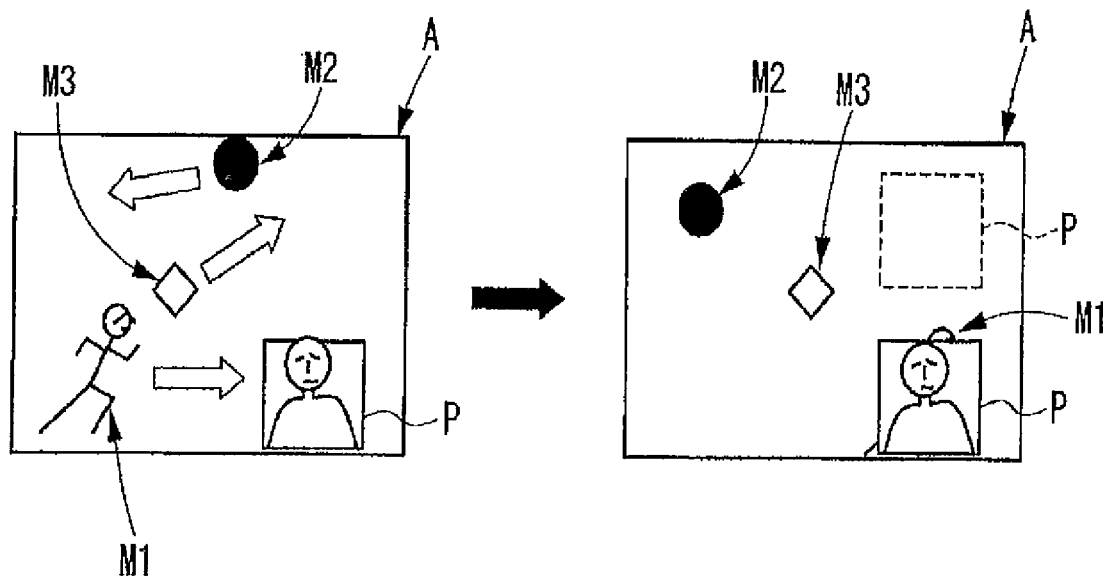
FIG. 14 is a diagram explaining the states of the main image and the auxiliary image in a case where the procedure of the fourth embodiment shown in FIG. 13 is not used.
Figure 15:
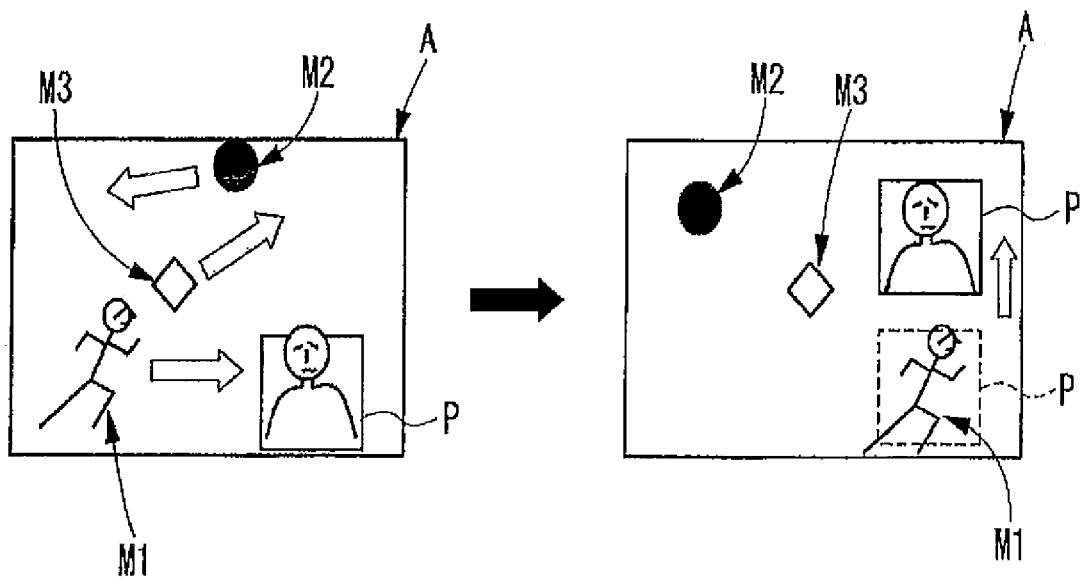
FIG. 15 is a diagram explaining the states of the main image and the auxiliary image in a case where the procedure shown in FIG. 13 is used.
Figure 16A:
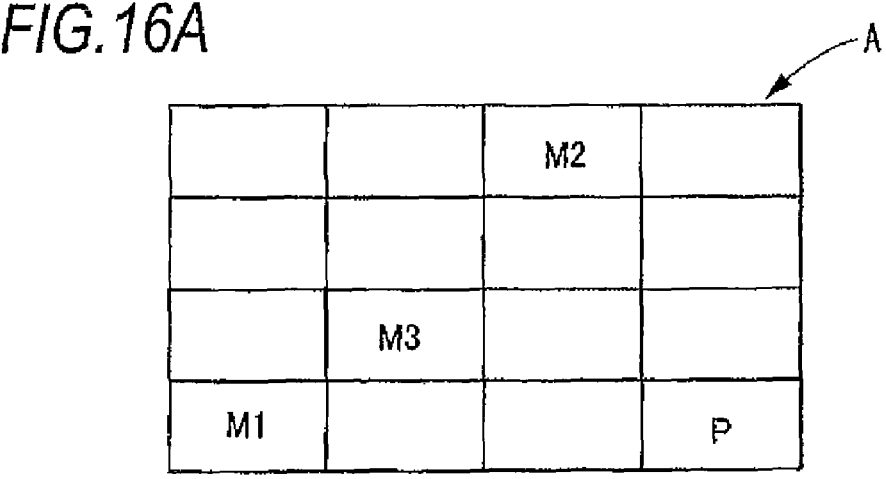
FIGS. 16A to 16C are diagrams illustrating the procedure for determining a region for combining the auxiliary image with the main image in the fourth embodiment.
Figure 16B:
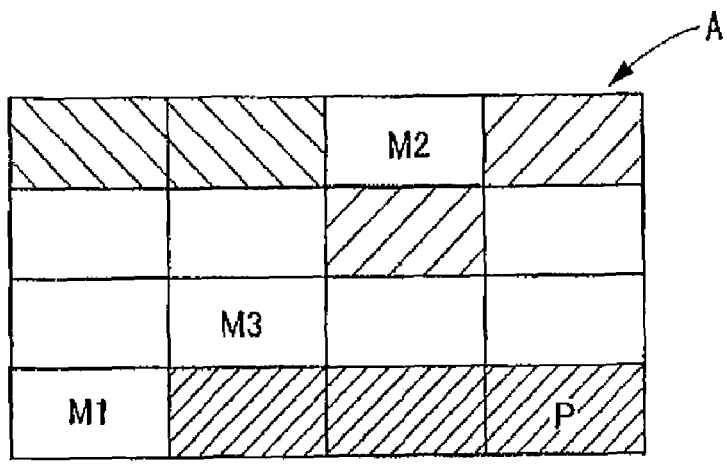
Figure 16C:
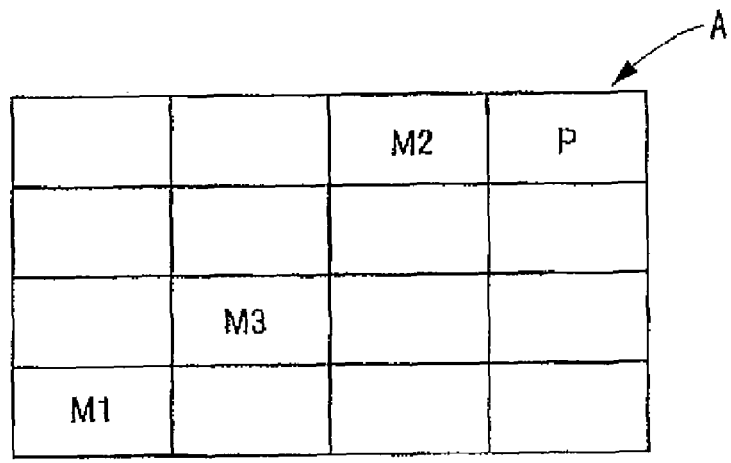

FIG. 13 is a flowchart illustrating the procedure of this embodiment. FIG. 14 is a diagram explaining the states of the main image and the auxiliary image in a case where the procedure of this embodiment is not used. FIG. 5 is a diagram explaining the states of the main image and the auxiliary image in a case where the procedure shown in FIG. 13 is used. FIGS. 14 and 15 show a state in which the auxiliary-image composite region P is set in the main image A, and a plurality of (in the drawing, three) moving objects M1, M2, and M3 are present in the main image A. FIG. 16A shows a state in which the positions of the moving objects M1, M2, and M3 and the auxiliary-image composite region P are set in the main image A divided into a plurality of regions. FIG. 16B shows the respective moving-object moving regions of the moving objects M1, M2, and M3. FIG. 16C shows a state after the auxiliary-image composite region P is changed to another region.

In this embodiment, processing similar to that of the above-described embodiments is executed in that when the moving objects M1, M2, and M3 are detected in the main image A, as shown in FIG. 16A, one of the moving objects M1, M2, and M3 is set as an attention-focused moving object, and if the moving-object moving region of the attention-focused moving object and the auxiliary-image composite region P overlap, the auxiliary-image composite region P is changed to a region other than the moving-object moving regions of the attention-focused moving object and the other moving objects. A description of the processing similar to that of the above-described embodiments will be omitted.

This embodiment differs from the above-described embodiments in that, in a case where the moving-object moving region of the attention-focused moving object M1 and the auxiliary-image composite region P overlap and the moving-object moving regions of the other moving objects M2 and M3 and the auxiliary-image composite region P overlap, the times when these other moving objects M2 and M3 reach a region where they overlap the auxiliary-image composite region P are computed. The times when the other moving objects M2 and M3 reach the region where they overlap the auxiliary-image composite region P can be computed by computing moving vectors on the basis of the differential data of the other moving objects M2 and M3 and by obtaining speeds from these moving vectors.

If the times when the other objects reach the region where they overlap the auxiliary-image composite region P are each greater than or equal to a preset threshold, the change of the auxiliary-image composite region P is executed. Meanwhile, if the times when the other objects reach the region where they overlap the auxiliary-image composite region P are each less than the threshold, a determination is made of the presence or absence of another region for which the determination has not yet been made, and a determination is made as to whether or not that region overlaps with the moving-object moving regions of the other moving objects. If they overlap, the determination processing is executed on the basis of the times when the other objects M2 and M3 reach the region where they overlap the auxiliary-image composite region P as well as the threshold value in the same way as described above. In the case where the auxiliary-image composite region P overlaps with the moving-object moving regions of the other moving objects M2 and M3, and the times when the moving objects M2 and M3 reach that overlapping region are each less than the threshold value, it is determined that the auxiliary-image composite region P cannot be changed, and the processing ends.

In the case where the plurality of moving objects M1, M2, and M3 are present in the main image A, as shown in FIG. 14, there are cases where all the regions other than the moving-object moving region of the attention focused moving object overlap with the moving-object moving regions of the other moving objects M2 and M3, and therefore the auxiliary-image composite region P cannot be changed. Accordingly, if the times when the other objects reach the region to which the auxiliary-image composite region P is to be changed are each greater than or equal to the threshold, the change of the auxiliary-image composite region P is allowed, thereby avoiding the attention-focused moving object M1 overlapping with the auxiliary image.

Next, a description will be given of a fifth embodiment in accordance with the invention with reference to FIGS. 17 to 19.

Figure 17:
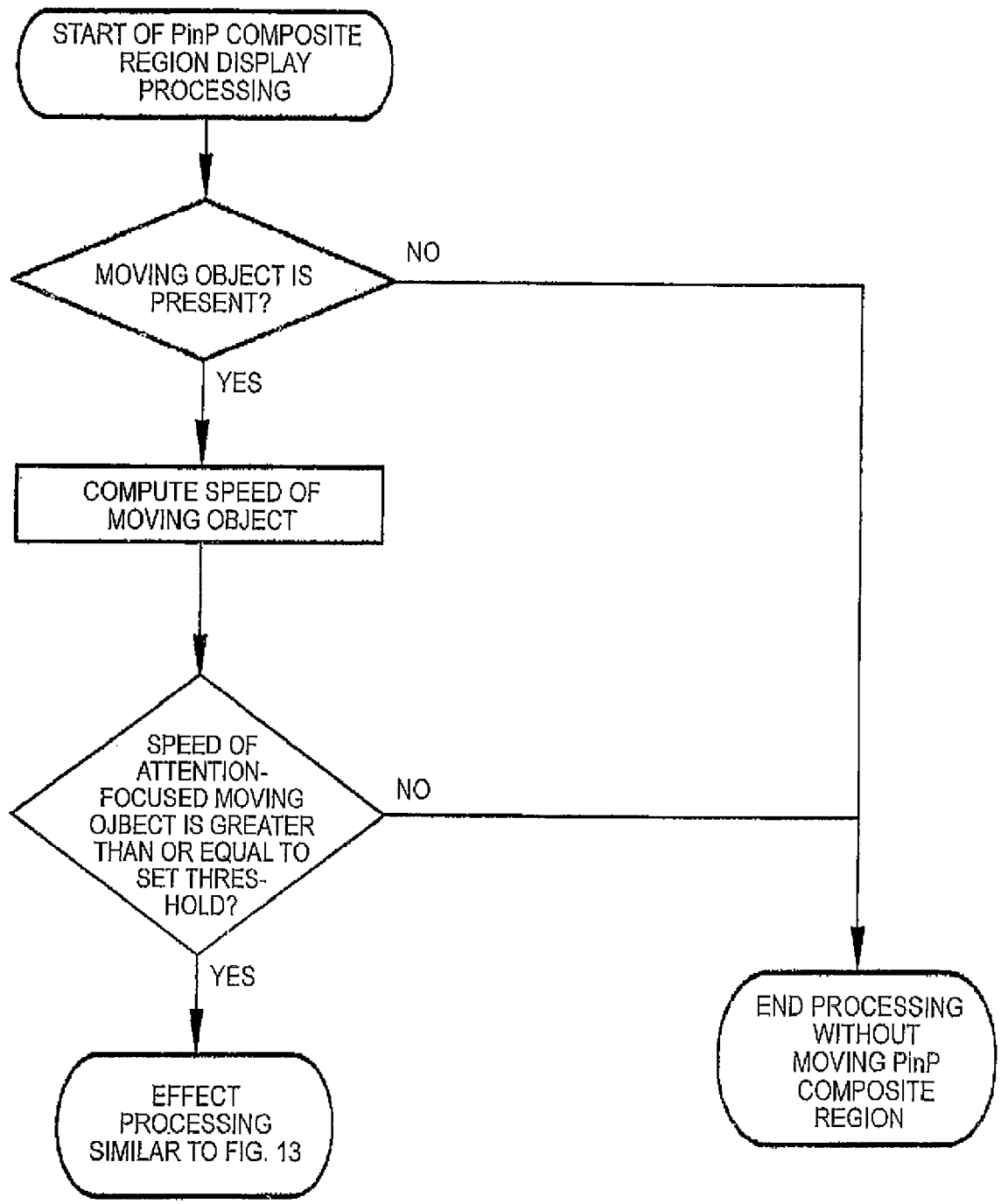
FIG. 17 is a flowchart illustrating the procedure of a fifth embodiment.

FIG. 17 is a flowchart illustrating the procedure of this embodiment. FIG. 18 is a diagram explaining the states of the main image and the auxiliary image in a case where the procedure of this embodiment is not used. FIG. 19 is a diagram explaining the states of the main image and the auxiliary image in the case where the procedure of FIG. 17 is used.

Figure 18:
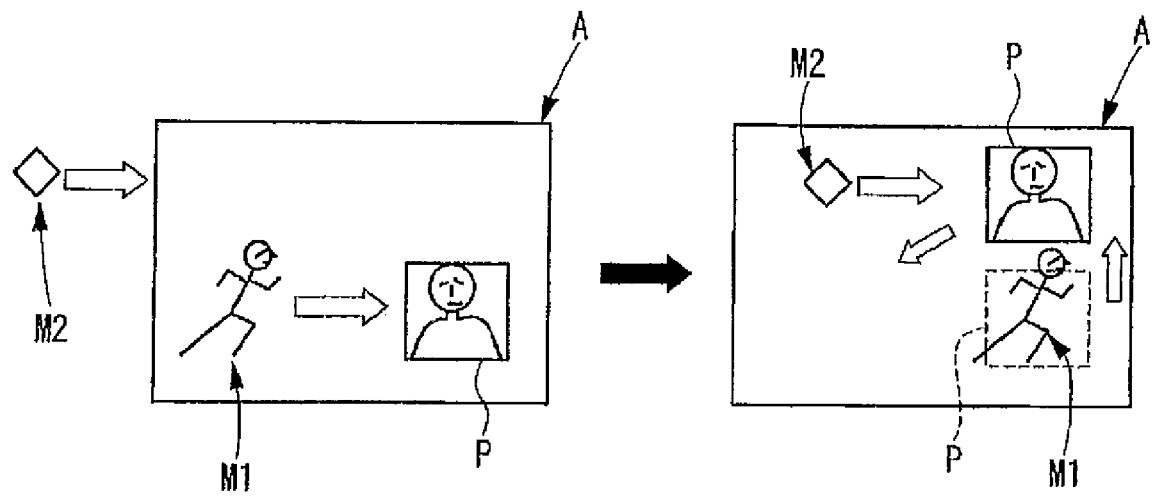
FIG. 18 is a diagram explaining the states of the main image and the auxiliary image in a case where the procedure of the fifth embodiment is not used.
Figure 19:
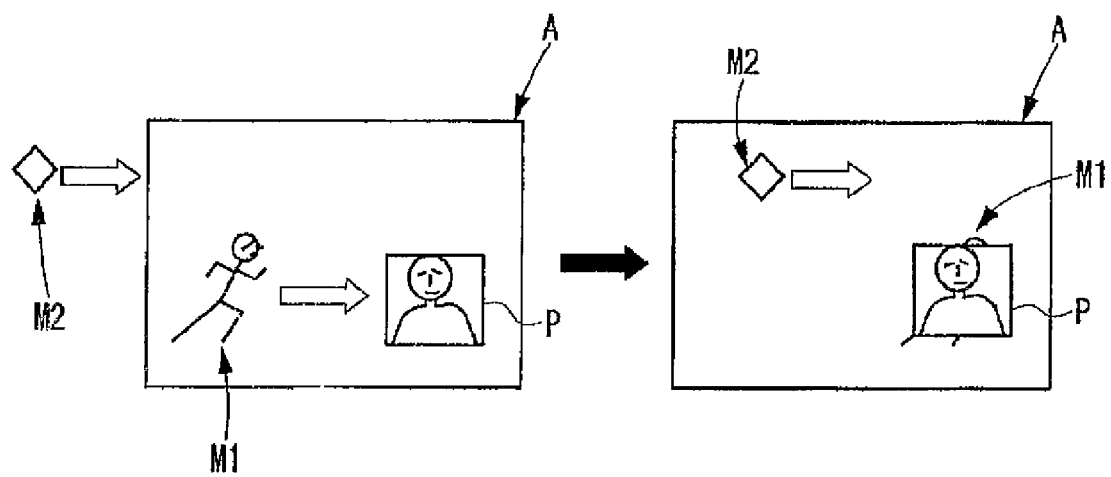
FIG. 19 is a diagram explaining the states of the main image and the auxiliary image in the case where the procedure shown in FIG. 17 is used.
Figure 20:
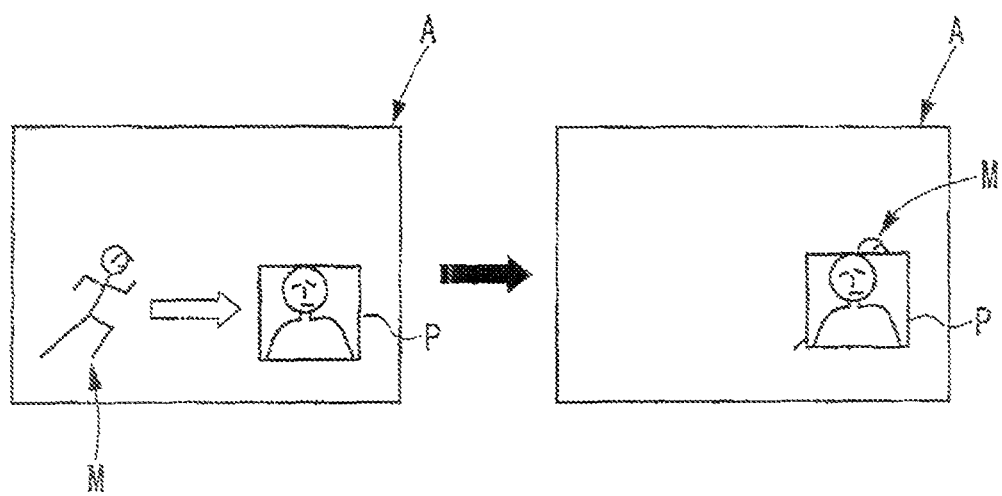
FIG. 20 is a diagram illustrating a state in which a moving picture is being displayed by using a PinP.

As shown in FIG. 18, in a case where the moving object M2 is displayed in the main image A in a short period of time in a state in which the moving object M1 is initially being displayed in the main image A, it the moving speeds of the moving objects M1 and M2 are fast, it is conceivable that the change of the auxiliary-image composite region is repeatedly executed in a short period of time, resulting in conspicuous changes in the position of that auxiliary-image composite region. In such a case, the main image A and the auxiliary image are difficult for the user to view to the contrary. Accordingly, in this embodiment, the auxiliary-image composite region is determined on the basis of the speeds of the moving objects M1 and M2.

As shown in FIG. 17, a determination is first made as to whether or not the moving objects M1 and M2 are present in the main image A, and if it is present, the speeds of the moving objects M1 and M2 are computed. Here, the speeds of the moving objects M1 and M2 can be computed on the basis of the differential data between frames of the moving objects M1 and M2. Further, a determination is made as to whether or not the speed of the attention-focused moving object (if there is only one moving object, the speed thereof) among the plurality of moving objects M1 and M2 is less than or equal to a threshold. If the speed of the attention-focused moving object is less than or equal to the threshold, the moving-object moving regions of the attention-focused moving object and the other moving objects are computed, and the auxiliary-image composite region P is changed to a region other than these moving-object moving regions, in the same way as in the embodiment shown in FIG. 13. IS the speed of the attention-focused moving object exceeds the threshold, the processing ends without executing the change of the auxiliary-image composite region P.

According to this embodiment, in a case where the moving objects M1 and M2 are displayed in the main image A at fast moving speeds, the change of the auxiliary-image composite region P in a short period of time is avoided, and the auxiliary-image composite region P is fixed at a fixed position in the main image A. For this reason, since the conspicuous changes of the position of the auxiliary image in the main image A can be avoided, it is possible to prevent the auxiliary image from becoming difficult to view.

It should be noted that the invention is not limited to the above-described embodiments, and appropriate modifications and improvements are possible.

For example, although in the above-described embodiments a description has been given by using the configuration of a digital camera as an example of the imaging apparatus, the invention is not limited to the same. In addition, the invention is also applicable to an image display device having a configuration which is not provided with an imaging unit and which fetches moving image data from the outside and is provided with a display unit such as an LCD for displaying the main image and the auxiliary image.

What is claimed is:

1. An image display device for displaying a main image and an auxiliary image that is combined with the main image in an auxiliary-image composite region of the main image, comprising:

a moving object detecting unit that detects a moving object which relatively moves in the main image to determine a moving direction of a path of movement of the moving object; and a composite region determining unit that predicts a moving-object moving region, into which the moving object will move in the main image, based on the moving direction of the detected moving object, and determines the auxiliary-image composite region based on information relating to the moving-object moving region, wherein the composite region determining unit, when the moving object detecting unit detects a plurality of moving objects in the main image, predicts the moving-object moving region for each of the detected moving objects based on a moving direction of each of the detected moving objects, among the plurality of moving objects, a moving object which reaches the auxiliary-image composite region fastest is set as an attention-focused moving object, and the composite region determining unit determines the auxiliary-image composite region to a region other than the moving-object moving region into which the attention-focused moving object will move, the composite region determining unit judges as to whether or not the auxiliary-image composite region determined based on the moving-object moving region of the attention-focused moving object overlaps with the moving-object moving region into which another one of the plurality of moving objects will move, and the composite region determining unit, when it overlaps, determines the auxiliary-image composite region to a region from which the moving-object moving region into which said another one will move is excluded.

2. An image display device for displaying a main image and an auxiliary image that is combined with the main image in an auxiliary-image composite region of the main image, comprising:

a moving object detecting unit that detects a moving object which relatively moves in the main image to determine a moving direction of a path of movement of the moving object; and a composite region determining unit that predicts a moving-object moving region, into which the moving object will move in the main image, based on the moving direction of the detected moving object, and determines the auxiliary-image composite region based on information relating to the moving-object moving region, wherein the composite region determining unit, when the moving object detecting unit detects a plurality of moving objects in the main image, predicts the moving-object moving region for each of the detected moving objects based on a moving direction of each of the detected moving objects, among the plurality of moving objects, a moving object which reaches the auxiliary-image composite region fastest is set as an attention-focused moving object, the composite region determining unit determines the auxiliary-image composite region to a region other than the moving-object moving region into which the attention-focused moving object will move, the composite region determining unit judges as to whether or not the auxiliary-image composite region determined based on the moving-object moving region of the attention-focused moving object overlaps with the moving-object moving region into which another one of the plurality of moving objects will move, and the composite region determining unit, when it overlaps, computes a time until said another one reaches the auxiliary-image composite region, and sets, when said time is greater than or equal to a fixed time, the auxiliary-image composite region in a region which overlaps with the moving-object moving region of the attention-focused moving object.

3. An image display method for displaying a main image and an auxiliary image that is combined with the main image in an auxiliary-image composite region of the main image, comprising:

detecting a moving object which relatively moves in the main image to determine a moving direction of a path of movement of the moving object;

predicting a moving-object moving region, into which the moving object will move in the main image, based on the moving direction of the detected moving object; and determining the auxiliary-image composite region based on information relating to the moving-object moving region, wherein predicting the moving-object moving region includes, predicting, when detecting a plurality of moving objects in the main image, the moving-object moving region for each of the detected moving objects based on a moving direction of each of the detected moving objects, among the plurality of moving objects, a moving object which reaches the auxiliary-image composite region fastest is set as an attention-focused moving object, determining the auxiliary-image composite region includes determining the auxiliary-image composite region to a region other than the moving-object moving region into which the attention-focused moving object will move, determining the auxiliary-image composite region includes judging as to whether or not the auxiliary-image composite region determined based on the moving-object moving region of the attention-focused moving object overlaps with the moving-object moving region into which another one of the plurality of moving objects will move, and determining the auxiliary-image composite region further includes, when it overlaps, determining the auxiliary-image composite region to a region which excludes the moving-object moving region into which said another one will move.

4. An image display method for displaying a main image and an auxiliary image that is combined with the main image in an auxiliary-image composite region of the main image, comprising:

detecting a moving object which relatively moves in the main image to determine a moving direction of a path of movement of the moving object;

predicting a moving-object moving region, into which the moving object will move in the main image, based on the moving direction of the detected moving object; and determining the auxiliary-image composite region based on information relating to the moving-object moving region, wherein predicting the moving-object moving region includes, predicting, when detecting a plurality of moving objects in the main image, the moving-object moving region for each of the detected moving objects based on a moving direction of each of the detected moving objects, among the plurality of moving objects, a moving object which reaches the auxiliary-image composite region fastest is set as an attention-focused moving object, determining the auxiliary-image composite region includes determining the auxiliary-image composite region to a region other than the moving-object moving region into which the attention-focused moving object will move, determining the auxiliary-image composite region includes judging as to whether or not the auxiliary-image composite region determined based on the moving-object moving region of the attention-focused moving object overlaps with the moving-object moving region into which another one of the plurality of moving objects will move, determining the auxiliary-image composite region includes computing, when it overlaps, a time until said another one reach the auxiliary-image composite region, and determining the auxiliary-image composite region includes setting, when said time is greater than or equal to a fixed time, the auxiliary-image composite region in a region which overlaps with the moving-object moving region of the attention-focused moving object.

* * * * *